US012372226B2

(12) United States Patent
Zhou et al.

(10) Patent No.: US 12,372,226 B2
(45) Date of Patent: Jul. 29, 2025

(54) ROTATING DEVICE FOR ADJUSTING PROJECTION ANGLE IN LARGE RANGE

(71) Applicant: Jiangsu Dalen Electronic Co., Ltd., Jiangsu (CN)

(72) Inventors: Liyun Zhou, Jiangsu (CN); Jianwei Zhang, Jiangsu (CN)

(73) Assignee: Jiangsu Dalen Electronic Co., Ltd., Jiangsu (CN)

( * ) Notice: Subject to any disclaimer, the term of this patent is extended or adjusted under 35 U.S.C. 154(b) by 0 days.

(21) Appl. No.: 18/332,003

(22) Filed: Jun. 9, 2023

(65) Prior Publication Data

US 2024/0410557 A1 Dec. 12, 2024

(51) Int. Cl.
*F21V 21/15* (2006.01)
*F21V 21/30* (2006.01)

(52) U.S. Cl.
CPC .............. *F21V 21/15* (2013.01); *F21V 21/30* (2013.01)

(58) Field of Classification Search
CPC ................................ F21V 21/15; F21V 21/30
USPC ......................................................... 362/233
See application file for complete search history.

(56) References Cited

U.S. PATENT DOCUMENTS

2020/0384287 A1* 12/2020 Hetz .................... A61N 5/0613

* cited by examiner

*Primary Examiner* — James R Greece
*Assistant Examiner* — Hana S Featherly
(74) *Attorney, Agent, or Firm* — LEASON ELLIS LLP

(57) ABSTRACT

The present disclosure discloses a rotating device for adjusting the projection angle in a large range, which belongs to the technical field of projection ceiling lights, including a base plate, a movable plate, a connecting screw and a driving mechanism, wherein the movable plate is hinged on the base plate, and the driving mechanism is connected to the movable plate, the lower end of the connecting screw is connected to the base plate, the connecting screw passes through the driving mechanism, and the connecting screw is screwed to the driving mechanism.

4 Claims, 2 Drawing Sheets

ROTATING DEVICE FOR ADJUSTING PROJECTION ANGLE IN LARGE RANGE

TECHNICAL FIELD

The present disclosure belongs to the technical field of projection ceiling lights, in particular to a rotating device for adjusting projection angles in a large range.

BACKGROUND ART

Ceiling light is a kind of light fixture. As the name suggests, it is called ceiling light because the top of this light fixture is relatively flat and the bottom is completely attached to the ceiling after installed. The light sources include ordinary incandescent light bulbs, fluorescent lamps, high-intensity gas discharge lamps, tungsten-halogen lamps, LEDs, etc. In order to meet the requirements of mass customers, the projector is integrated into the ceiling light to form a projection ceiling light.

At present, due to the high weight of the projector and the limited space inside the ceiling light, a greater torsion is required to directly drive the rotating shaft to rotate by driving motor, and the adjustment angle of the projector is limited.

SUMMARY

The purpose of the present disclosure is to provide a rotating device for adjusting the projection angle in a large range, so as to solve the problem that the weight of the projector is large and the space inside the ceiling light is limited, and a greater torsion is required to directly drive the rotating shaft to rotate by the driving motor, which leads to the problem that the adjustment of the projection angle of the projector is limited.

In order to achieve the above object, the present disclosure adopts the technical solution as follows. A rotating device for adjusting the projection angle in a large range includes a base plate, a movable plate, a connecting screw and a driving mechanism, wherein the movable plate is hinged on the base plate, and the driving mechanism is connected to the movable plate, the lower end of the connecting screw is connected to the base plate, the connecting screw passes through the driving mechanism, and the connecting screw is screwed to the driving mechanism.

As a further description of the above technical solution, the driving mechanism includes a driving motor, a driving gear and a driven gear, wherein the driving gear and the driven gear are both hinged on the movable plate, the driving gear meshes with the driven gear, and the driving motor is fixedly installed on the movable plate and the driving motor is connected to the driving gear, and the connecting screw passes through the driven gear and is screwed to the driven gear.

As a further description of the above technical solution, a baffle is connected to the movable plate, and the baffle shields the driving gear and the driven gear.

As a further description of the above technical solution, the axis of the driven gear coincides with the axis of the connecting screw.

As a further description of the above technical solution, a hinge seat is provided on the base plate, a waist-shaped groove is provided on the hinge seat, and a hinge rod is provided at the lower end of the connecting screw, and the hinge rod is inserted into the waist-shaped groove.

As a further description of the above technical solution, the base plate is connected with the movable plate through two central rotating shafts.

In summary, due to the adoption of the above technical solution, the beneficial effects of the present disclosure are as follow.

In the present disclosure, the rotation of the driving motor drives the driving gear to rotate, wherein the driving gear drives the driven gear to rotate and the helical action between the driven gear and the connecting screw is converted into a pulling effect on the connecting screw, thereby adjusting the angle between the base plate and the movable plate. At this time, the hinge rod rotates along the hinge seat, and at the same time, the hinge rod slides along the waist-shaped groove, so as to release the restricted degree of freedom of the connecting screw, such that the driving motor does not need a larger torsion, and the space is arranged reasonably, which is convenient for large range of projection angle adjustments.

REFERENCE NUMERALS

1. base plate; 2. movable plate; 3. connecting screw; 4. driving mechanism; 41. driving motor; 42. driving gear; 43. driven gear; 5. baffle; 6. hinge seat; 7. waist-shaped groove; 8. hinge rod; 9. central rotating shaft.

DETAILED DESCRIPTION OF EMBODIMENTS

The technical solutions in the embodiments of the present disclosure will be clearly and completely the below in conjunction with the accompanying drawings in the embodiments of the present disclosure. Obviously, the embodiments described are only part of the embodiments of the present disclosure, rather than all of them. Based on the embodiments of the present disclosure, all other embodiments obtained by persons of ordinary skill in the art without inventive efforts belong to the scope of protection of the present disclosure.

Figure 1:
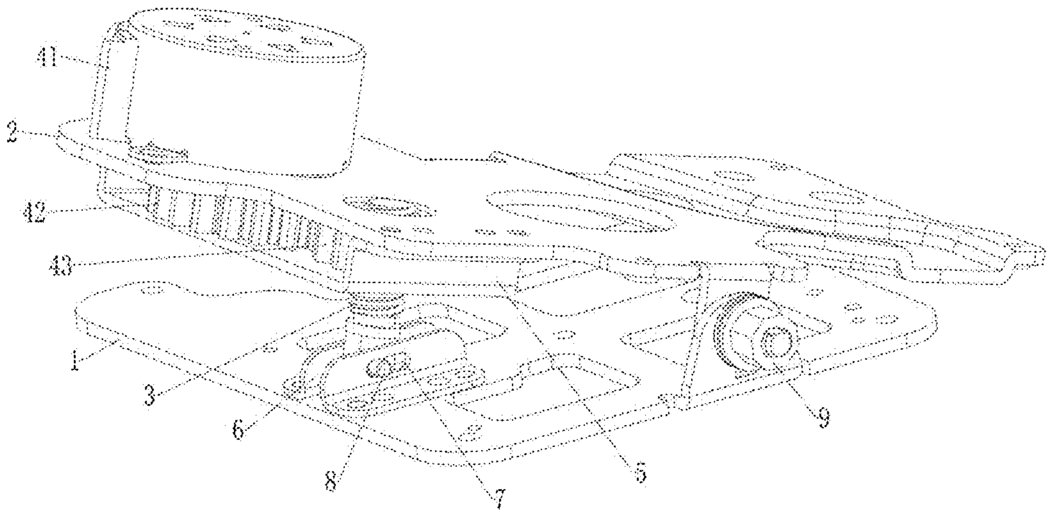
FIG. 1 is a first overall structural schematic view of a rotating device for adjusting projection angles in a large range.
Figure 2:
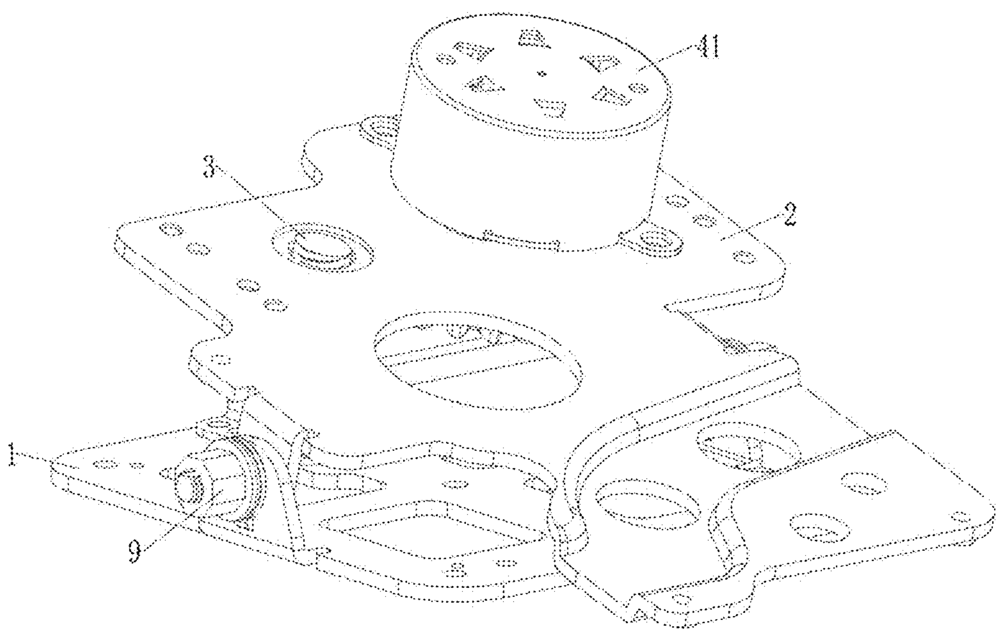
FIG. 2 is a second overall structural schematic view of a rotating device for adjusting projection angles in a large range.
Figure 3:
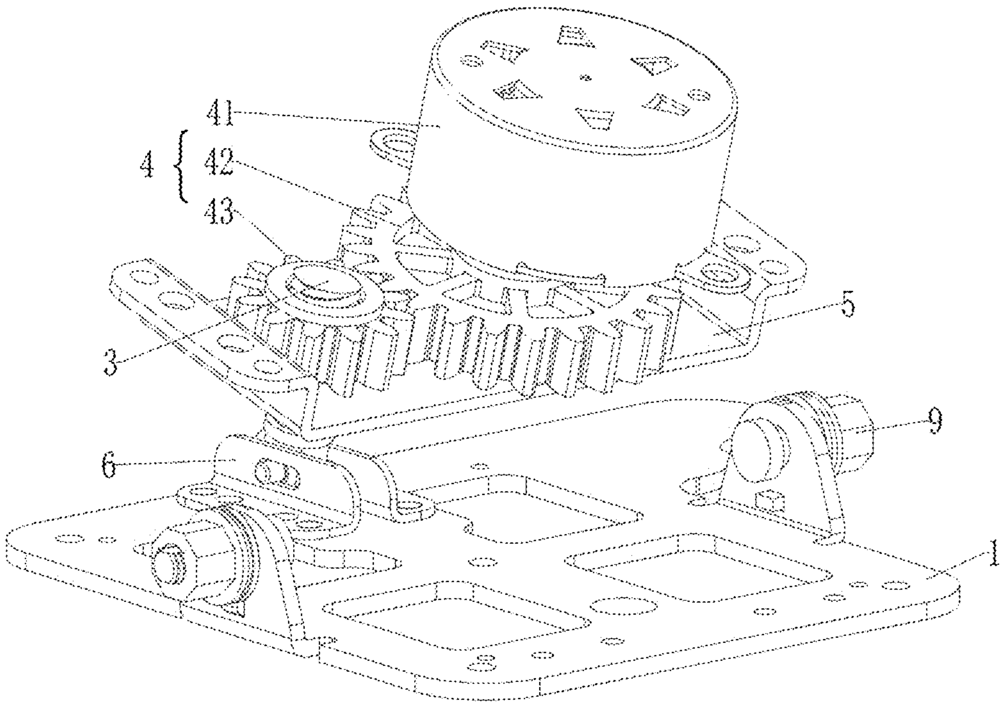
FIG. 3 is an internal structural schematic view of a rotating device for adjusting projection angles in a large range.
Figure 4:
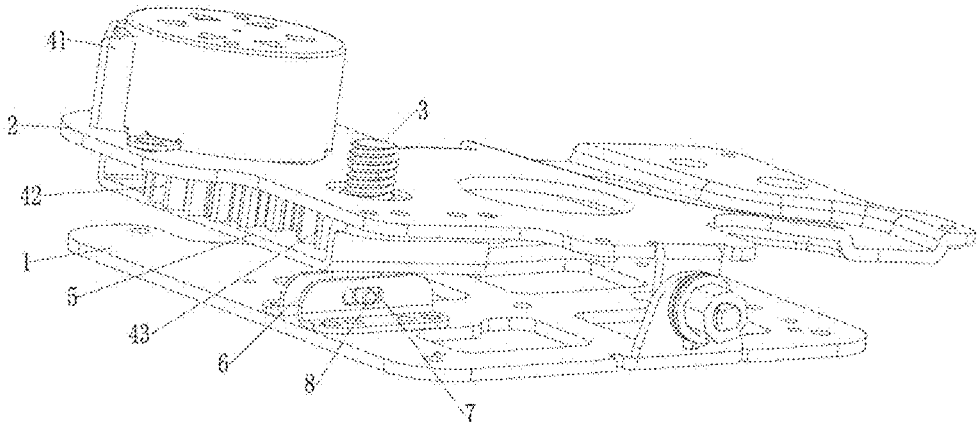
FIG. 4 is a reference view of a rotating device for adjusting projection angles in a large range in a using state.

Referring to FIGS. 1-4, the present disclosure provides a technical solution: a rotating device for adjusting the projection angle in a large range, including a base plate 1, a movable plate 2, a connecting screw 3 and a driving mechanism 4, wherein the movable plate 2 is hinged on the base plate 1, the driving mechanism 4 is connected to the movable plate 2, the lower end of the connecting screw 3 is connected to the base plate 1, the connecting screw 3 passes through the driving mechanism 4, and the connecting screw 3 is screwed to the driving mechanism 4.

The driving mechanism 4 includes a driving motor 41, driving gear 42 and driven gear 43, wherein both the driving gear 42 and the driven gear 43 are hinged on the movable plate 2, the driving gear 42 and the driven gear 43 mesh with each other, the driving motor 41 is fixedly installed on the movable plate 2, and the driving motor 41 is connected to the driving gear 42, the connecting screw 3 passes through the driven gear 43 and is screwed to the driven gear 43. The driving motor 41 rotates to drive the driving gear 42 to rotate, the driving gear 42 drives the driven gear 43 to rotate, and the helical action between the driven gear 43 and the connecting screw 3 is converted into a pulling effect on the connecting screw 3, thereby adjusting the angle between the base plate 1 and the movable plate 2, without setting the driving motor 41 at the hinged position between the base plate 1 and the movable plate 2, such that the layout is reasonable, the variable angle range between the base plate 1 and the movable plate 2 becomes larger, and the problem of limited projection angle is solved.

The baffle 5 is connected to the movable plate 2, wherein the baffle 5 shields the driving gear 42 and the driven gear 43, thereby the baffle 5 has the function of supporting and protecting the driving gear 42 and the driven gear 43.

The axis of the driven gear 43 coincides with the axis of the connecting screw 3.

The base plate 1 is provided with a hinge seat 6, the hinge seat 6 is provided with a waist-shaped groove 7, and the lower end of the connecting screw 3 is provided with a hinge rod 8, wherein the hinge rod 8 is inserted into the waist-shaped groove 7, the movable plate 2 rotates along the base plate 1, and the connecting screw 3 moves along the axial direction of the driven gear 43, such that the lower end portion of the connecting screw 3 rotates on the base plate 1 and needs to slide. At this time, the hinge rod 8 rotates along the hinge seat 6, and the hinge rod 8 slides along the waist-shaped groove 7, so as to release the restricted degree of freedom of the connecting screw 3.

The base plate 1 and the movable plate 2 are connected through two central rotating shafts 9, which facilitates the connection between the base plate 1 and the movable plate 2, and ensures the smooth rotation of the movable plate 2.

Working principle is as follows. Firstly, the base plate 1 is installed on the ceiling light, and the projector is installed on the movable plate 2. Secondly, when the projection angle of the projector needs to be adjusted, the driving motor 41 rotates to drive the driving gear 42 to rotate, and the driving gear 42 drives the driven gear 43 to rotate, wherein the helical action between the driven gear 43 and the connecting screw 3 is converted into a pulling effect on the connecting screw 3, thereby adjusting the angle between the base plate 1 and the movable plate 2. At this time, the degrees of freedom for rotation and sliding of the end of the connecting screw 3 connected to the base plate 1 need to be released, then the hinge rod 8 rotates along the hinge seat 6, and the hinge rod 8 slides along the waist-shaped groove 7 to release the restricted degree of freedom of the connecting screw 3. Finally, the driving motor 41 stops rotating, and the adjustment of the projection angle of the projector is completed.

The above is only a preferred embodiment of the present disclosure, but the scope of protection of the present disclosure is not limited thereto. For anyone skilled in the art within the technical scope disclosed in the present disclosure, the equivalent replacement or change, made according to the technical solution of the present disclosure and the concept of the present disclosure, shall be covered within the protection scope of the present disclosure.

What is claimed is:

1. A rotating device for adjusting projection angles in a large range, comprising a base plate, a movable plate, a connecting screw and a driving mechanism, wherein the movable plate is hinged on the base plate, the driving mechanism is connected to the movable plate, a lower end of the connecting screw is connected to the base plate, and the connecting screw passes through the driving mechanism, and the connecting screw is screwed to the driving mechanism, wherein the driving mechanism comprises a driving motor, a driving gear and a driven gear, wherein both the driving gear and the driven gear are hinged on the movable plate, the driving gear and the driven gear mesh with each other, the driving motor is fixedly installed on the movable plate, the driving motor is connected to the driving gear, and the connecting screw passes through the driven gear and screwed to the driven gear, and wherein the base plate is provided with a hinge seat, a waist-shaped groove is provided on the hinge seat, the lower end of the connecting screw is provided with a hinge rod, and the hinge rod is inserted into the waist-shaped groove, wherein the rotating device is used to adjust the projection angles of a projector in a projection ceiling light.

2. The rotating device for adjusting projection angles projection ceiling light in a large range according to claim 1, wherein a baffle is connected to the movable plate, and the baffle shields the driving gear and the driven gear.

3. The rotating device for adjusting projection angles in a large range according to claim 1, wherein an axis of the driven gear coincides with an axis of the connecting screw.

4. The rotating device for adjusting projection angles in a large range according to claim 1, wherein the base plate and the movable plate are connected through two central rotating shafts.

* * * * *